United States Patent
Lee et al.

(10) Patent No.: US 11,236,718 B1
(45) Date of Patent: Feb. 1, 2022

(54) CONTROL OF PRE-ENGAGED PINION STARTER

(71) Applicant: GM Global Technology Operations LLC, Detroit, MI (US)

(72) Inventors: Chunhao J. Lee, Troy, MI (US); Chandra S. Namuduri, Troy, MI (US); Farzad Samie, Franklin, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/085,168

(22) Filed: Oct. 30, 2020

(51) Int. Cl.
*F02N 11/08* (2006.01)
*F02N 15/06* (2006.01)

(52) U.S. Cl.
CPC ...... *F02N 11/0855* (2013.01); *F02N 11/0822* (2013.01); *F02N 15/06* (2013.01); *F02N 2200/022* (2013.01); *F02N 2200/102* (2013.01)

(58) Field of Classification Search
CPC .. F02N 11/0855; F02N 11/0822; F02N 15/06; F02N 2200/102; F02N 2200/022

USPC ............. 123/179.3, 179.4, 179.25
See application file for complete search history.

(56) References Cited

U.S. PATENT DOCUMENTS

2015/0051821 A1* 2/2015 Presot ............... F02N 11/0844
701/113

* cited by examiner

*Primary Examiner* — Hai H Huynh
(74) *Attorney, Agent, or Firm* — Vivacqua Crane PLLC

(57) ABSTRACT

A pre-engaged piston starter system of an automobile vehicle includes an engine having a flywheel to start the engine connected to the engine by an engine shaft. A starter motor provides rotational energy to a starter gear. A pinion gear transfers rotational energy of the starter gear to the flywheel. A solenoid is energized to shift the pinion gear to an engaged position between the flywheel and the starter gear. An auto-stop mode is entered when an engine speed is decreased below a calibrated threshold speed defining approximately 250 rpm. A calculated pinion pre-engagement engine speed allows engagement of the pinion gear when the engine speed is below the calibrated threshold speed.

17 Claims, 3 Drawing Sheets

CONTROL OF PRE-ENGAGED PINION STARTER

INTRODUCTION

The present disclosure relates to automobile vehicle starter motor gear meshing during engine start including during engine auto-stop and engine fast start operation.

To improve engine emissions and fuel economy, some automobile vehicles are equipped with an engine auto-stop function. The engine auto-stop function identifies when the automobile vehicle temporarily stops for example at stop signs, stop lights, in rush-hour traffic, and the like. During these temporary stop conditions the engine is stopped and fuel flow to the engine is stopped. Upon receipt of a drive command such as the operator lifting pressure off a brake pedal, the engine receives a rapid start signal which initiates fuel flow and initiates operation of a starter motor. An electric starter system with the starter motor needs to be engaged with the engine prior to each start. A solenoid device may be used to pre-engage a pinion gear to the flywheel to reduce start time and noise prior to spinning the engine. However, the solenoid device continuously consumes power during the pre-engagement.

A time delay of 40 ms to 50 ms may be incurred before a starter motor pinion gear engages the flywheel gear to restart the engine, which may be objectionable to the vehicle operator. Also, as the engine speed drops toward engine stop, if a change-of-mind occurs during which the operator elects to lift pressure off the brake, normally signaling an engine restart, an engine speed below approximately 200 rpm may not be available for rapid engine start due to engine vacuum or temperature conditions. Forcing the starter pinion into engagement with the starter pinion and the flywheel gear during this period may cause gear tooth butting resulting in gear noise and damage to the gear teeth.

Thus, while current starter motor and pinion gear operations during auto-stop operations achieve their intended purpose, there is a need for a new and improved pre-engaged piston starter system and method for operating a pre-engaged starter system.

SUMMARY

According to several aspects, a pre-engaged piston starter system of an automobile vehicle including a starter motor providing rotational energy to a starter gear. A pinion gear is releasably engaged with a flywheel, the pinion gear transferring rotational energy of the starter gear to the flywheel. An auto-stop mode is provided wherein an engine speed is decreased below a calibrated threshold speed. A pinion pre-engagement engine speed is calculated allowing engagement of the pinion gear after the engine speed is reduced below the calibrated threshold speed.

In another aspect of the present disclosure, an engine has the flywheel to start the engine connected to the engine by an engine shaft. A solenoid is energized to shift the pinion gear to an engaged position between the flywheel and the starter gear.

In another aspect of the present disclosure, an electric starter system is energized when the engine speed decreases below the calibrated threshold speed to energize the solenoid to displace the pinion gear to the engaged position.

In another aspect of the present disclosure, a controller is in communication with the electric starter system to electrically and automatically energize the solenoid.

In another aspect of the present disclosure, control signals defining a change-of-mind are generated by the controller and sent to the solenoid, the change-of-mind defining an operator lifting pressure off a brake pedal.

In another aspect of the present disclosure, the pinion pre-engagement engine speed is based on a number of teeth (N) on the flywheel.

In another aspect of the present disclosure, the pinion pre-engagement engine speed is further based on a quantity of teeth (n) of the flywheel passing during an estimated engaging time defining $\Delta t$.

In another aspect of the present disclosure, a delay period of approximately 20 msec to 40 msec is allowed following actuation of the solenoid until initiation of the starter motor to permit engagement of the pinion gear.

In another aspect of the present disclosure, following engine start the solenoid is de-energized and a biasing member provides withdrawal force to retract the pinion gear to a disengaged position.

In another aspect of the present disclosure, a solenoid shaft connects the solenoid to the pinion gear; and gear teeth of the flywheel provide mechanical rotation of the flywheel when engaged by pinion gear teeth of the pinion gear.

According to several aspects, a pre-engaged piston starter system of an automobile vehicle includes an engine having a flywheel to start the engine connected to the engine by an engine shaft. A starter motor provides rotational energy to a starter gear. A pinion gear transfers rotational energy of the starter gear to the flywheel. A solenoid is energized to shift the pinion gear to an engaged position between the flywheel and the starter gear. An auto-stop mode is entered when an engine speed is decreased below a calibrated threshold speed defining approximately 250 rpm. A calculated pinion pre-engagement engine speed allows engagement of the pinion gear with the flywheel below the calibrated threshold speed.

In another aspect of the present disclosure, an electric starter system is energized when the engine speed decreases below the calibrated threshold speed to energize the solenoid and displace the pinion gear to the engaged position.

In another aspect of the present disclosure, a controller is in communication with the electric starter system to electrically and automatically energize the solenoid. A change-of-mind signal generated by the controller and sent to the solenoid, the change-of-mind signal defining an operator lifting pressure off a brake pedal thereby requesting an auto-start operation.

In another aspect of the present disclosure, an engine stopping speed is monitored by the controller and covers a range of engine speeds and initially defines an engine operating speed, the engine stopping speed is compared to a predefined engagement criteria defining the pinion pre-engagement engine speed.

In another aspect of the present disclosure, the pinion pre-engagement engine speed is based on a number of teeth (N) on the flywheel; and the pinion pre-engagement engine speed is further based on a quantity of teeth (n) of the flywheel passing during an estimated engaging time.

In another aspect of the present disclosure, the auto-stop mode is further defined when the automobile vehicle engine is stopping and a fuel supply to the engine is being cut.

In another aspect of the present disclosure, a time period of approximately 20 msec to 30 msec is eliminated from a total auto-start time following actuation of the solenoid during the auto-stop mode.

According to several aspects, a method for operating a pre-engaged piston starter system of an automobile vehicle includes: determining if an automobile vehicle engine is stopping and if a fuel supply to the engine is being cut; querying if predetermined conditions defining an engine auto-stop event are present; monitoring an engine stopping speed; comparing the engine stopping speed to a predefined engagement criteria; generating a criteria MET signal when the engine stopping speed meets the predefined engagement criteria; and forwarding a pinion engagement command to direct energy to a starter motor, thereby initiating actuation of a solenoid and engagement of a pinion gear to prepare for an auto-start of the engine.

In another aspect of the present disclosure, the method includes limiting actuation of the solenoid and pinion engagement to when an engine stop is temporary defined as an engine restart occurring within in a predetermined period of time.

In another aspect of the present disclosure, the method includes precluding actuation of the solenoid and pinion engagement during a key crank start, following a key shut off, and during any engine shut-off with a transmission in a park position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
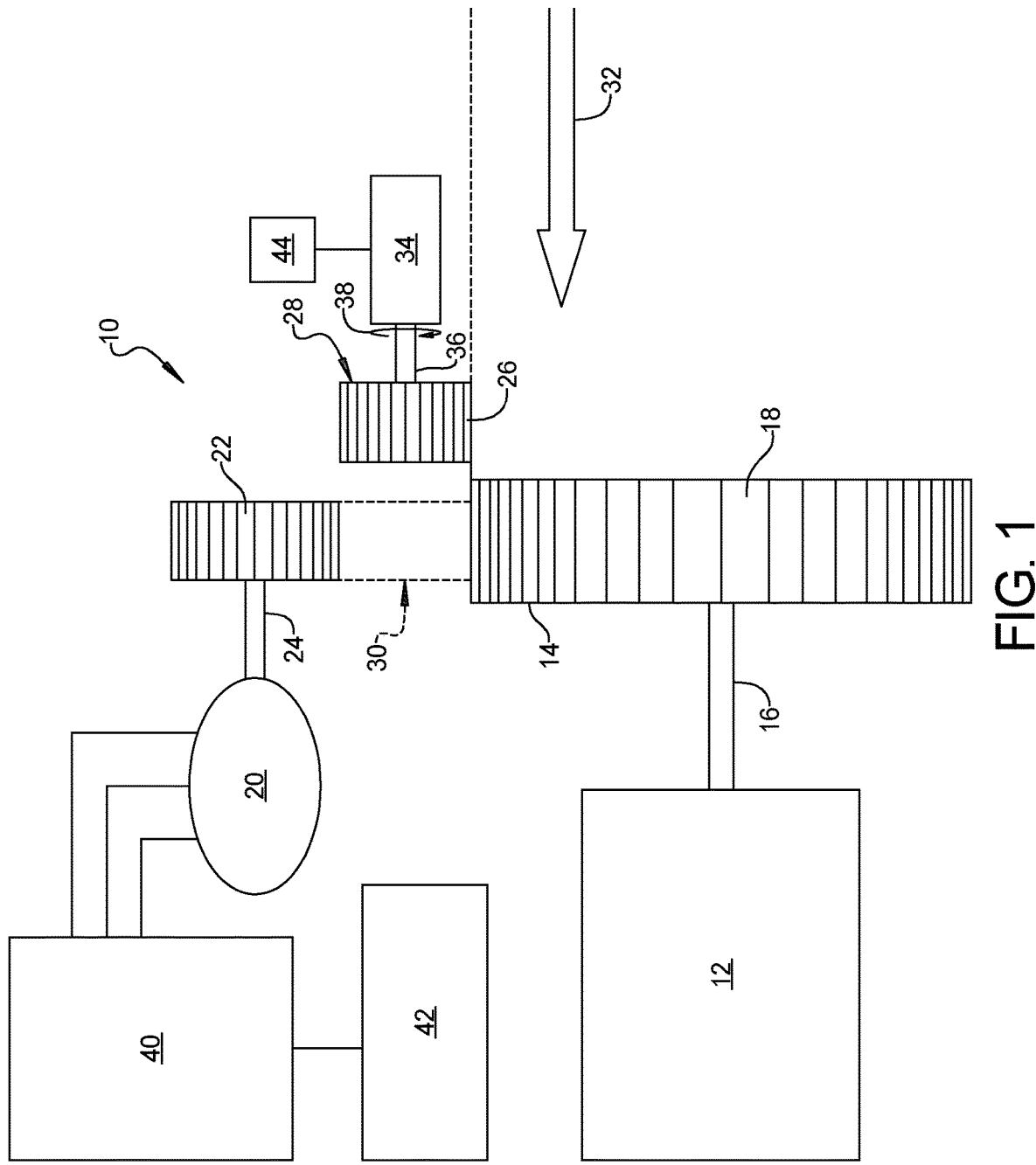
FIG. 1 is a diagrammatic view of a pre-engaged piston starter system and method for operating a pre-engaged starter system according to an exemplary aspect.

Referring to FIG. 1, a pre-engaged piston starter system and method for operating a pre-engaged starter system 10 for an automobile vehicle includes an engine 12 having a flywheel 14 or flex-plate for starting the engine 12 connected to the engine 12 by an engine shaft 16. Gear teeth 18 of the flywheel 14 provide for mechanical rotation of the flywheel 14. A starter motor 20 provides rotational energy to a starter gear 22 through a starter motor shaft 24. A pinion gear 26 transfers rotational energy of the starter gear 22 to the gear teeth 18 of the flywheel 14. During normal operation of the engine 12 the pinion gear 26 is positioned at a disengaged position 28. During engine start the pinion gear 26 is shifted to an engaged position 30 (shown in phantom) in a displacement direction 32 between the flywheel 14 and the starter gear 22 by energizing a solenoid 34. The pinion gear 26 is connected to the solenoid 34 by a solenoid shaft 36 and displaced by translation of the solenoid shaft 36.

Operation of the solenoid 34 draws approximately 20 Amps to 40 Amps to displace the pinion gear 26 from the disengaged position 28 to the engaged position 30. A holding power of approximately 3 to 4 Amps is thereafter applied to maintain the engaged position 30 of the pinion gear 26. A delay period of approximately 20 msec to 40 msec is allowed following actuation of the solenoid 34 until initiation of the starter motor 20 to ensure full engagement of the pinion gear 26. Following engine start the solenoid 34 is de-energized and a biasing member 38 provides a withdrawal force to retract the pinion gear 26 to the disengaged position 28 in a direction opposite to the displacement direction 32.

When a speed of the engine 12 is decreasing, such as after initiation of a fuel-conserving auto-stop event of the engine 12, an electric starter system 40 may be electrically and automatically energized in response to control signals sent to the solenoid 34 from a controller 42 to selectively displace the pinion gear 26 to the engaged position 30 or to hold the pinion gear 26 at the engaged position 30 using a reduced amperage to allow a starting motor torque to be delivered to the flywheel 14 with the reduced amperage held until an auto-start is initiated, or a subsequent key-off is selected.

In particular, the controller 42 executes logic embodying the system and method 10 as part of a pinion pre-engagement scheme when the engine 12 is in an auto-stop mode with an engine rotational speed below a calibrated threshold speed and prior to reaching a zero speed. To hold the pinion gear 26 at the engaged position 30 a latch mechanism 44 may be energized and set to a latched position which holds the solenoid 34 in the pre-engaged position wherein the pinion gear 26 is engaged at the engaged position 30 with the flywheel 14, and thus with the engine 12, until a commanded restart operation of the engine 12 using the starter motor 20 is complete.

After the latch mechanism 44 is in the latched position, the controller 42 may reduce a level of a current that is supplied to the solenoid 34 to approximately 2 to 4 Amps. In such reduced current state, the latch mechanism 44 mechanically holds the solenoid 34 in the pre-engaged position without increasing the supply of power, as described herein.

In an auto-stop mode is first confirmed, an auto-start operation may then be performed. Following the auto-stop, the engine speed is monitored and when the engine speed decreases below the calibrated threshold speed the solenoid 34 may be energized to hold the pinion gear 26 at the engaged position 30 using approximately 3 to 4 Amps of solenoid power. In this manner, the solenoid 34 in the pre-engaged position engages the pinion gear 26 in meshed engagement with the flywheel 14, e.g., with a spline or the gear teeth 18, using minimal power of the solenoid 34.

The gear mesh between the pinion gear 26 and the flywheel 14 uses a precise calculation to mitigate against tooth butting and to mitigate against tooth engagement too early which may damage the pinion teeth. To calculate a pinion pre-engagement engine speed S allowing engagement of the pinion gear 26 without gear tooth butting, the pinion pre-engagement engine speed S is based in part on a number of teeth (N) on the flexplate or flywheel 14, and a quantity of teeth (n) passing during an estimated engaging time defining $\Delta t$.

For the quantity (n) of pinion teeth moving before pinion engagement, the pinion pre-engagement engine speed S may be calculated using Equation 1 below:

$$S = \left(\left(1 \Big/ \left(\frac{N\text{\# Fly Teeth}}{n}\right)\right) \Big/ \Delta t\right) \times (1000 \text{ msec/sec}) \times (60 \text{ sec/min}) \quad \text{Equation 1}$$

For example, using a quantity (n) of 2 flywheel teeth passing in an estimated engaging time Δt of 30 msec, and with 47 teeth (N) on the flywheel 14 or flex-plate, the pinion pre-engagement engine speed S is 85 rpm.

Referring to FIG. 2 and again to FIG. 1, a graph 46 presents an engine speed 48 in revolutions per minute (rpm) versus time (sec). An engine stopping speed 52 is decreasing below 400 rpm toward zero. As the engine stopping speed reaches a speed ranging between approximately 250 rpm to 200 rpm defining a speed threshold 54 the pre-engaged piston starter system and method for operating a pre-engaged starter system 10 may be initiated to position the pinion gear 26 for engagement. A pinion request 56 is initiated and an accelerator pedal request position 58 and a vehicle speed are monitored through a period of time until an engine-on request 62 is received.

Figure 2:
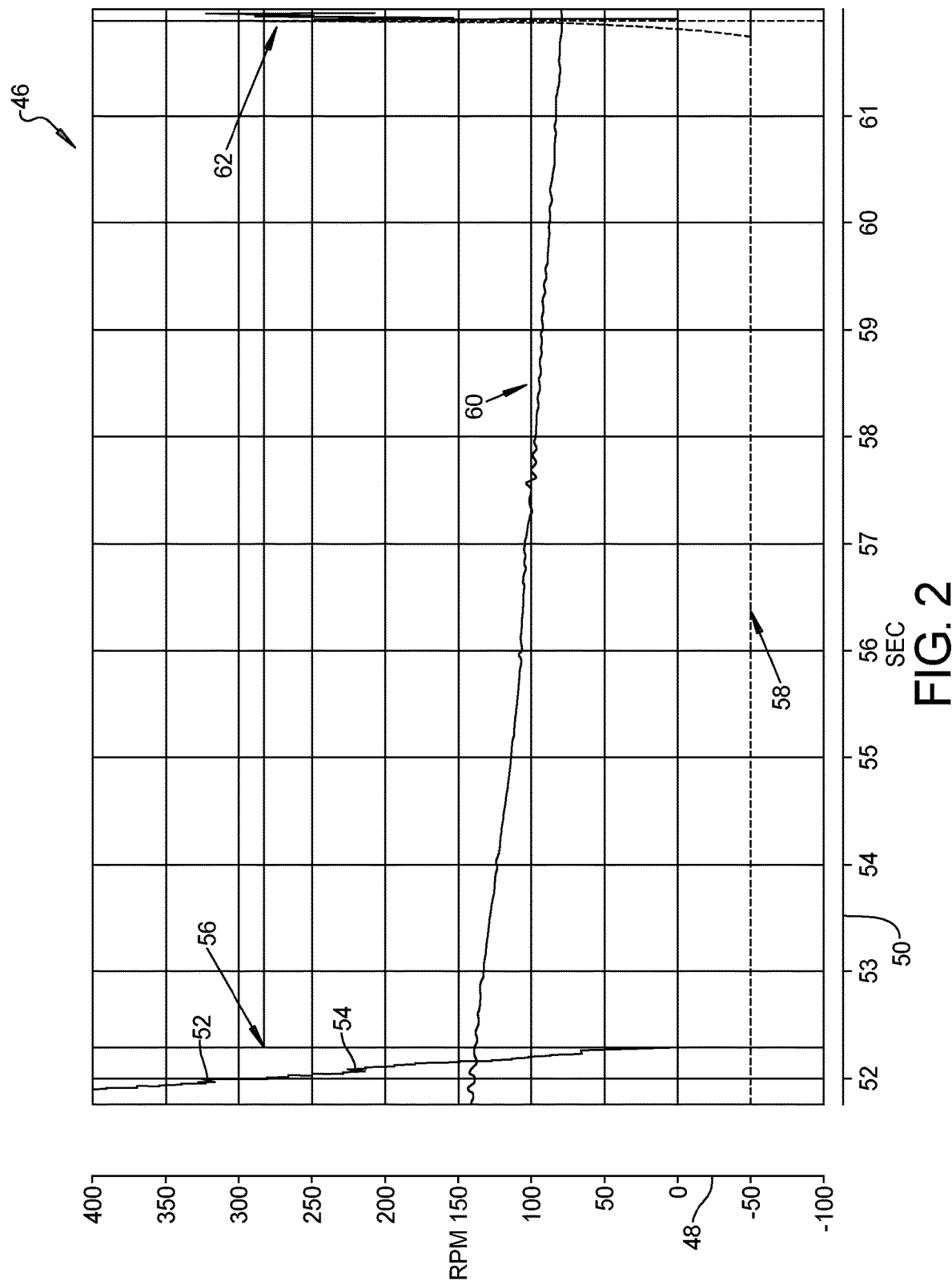
FIG. 2 is a graph presenting operating system parameters for operation of the system of FIG. 1.
Figure 3:
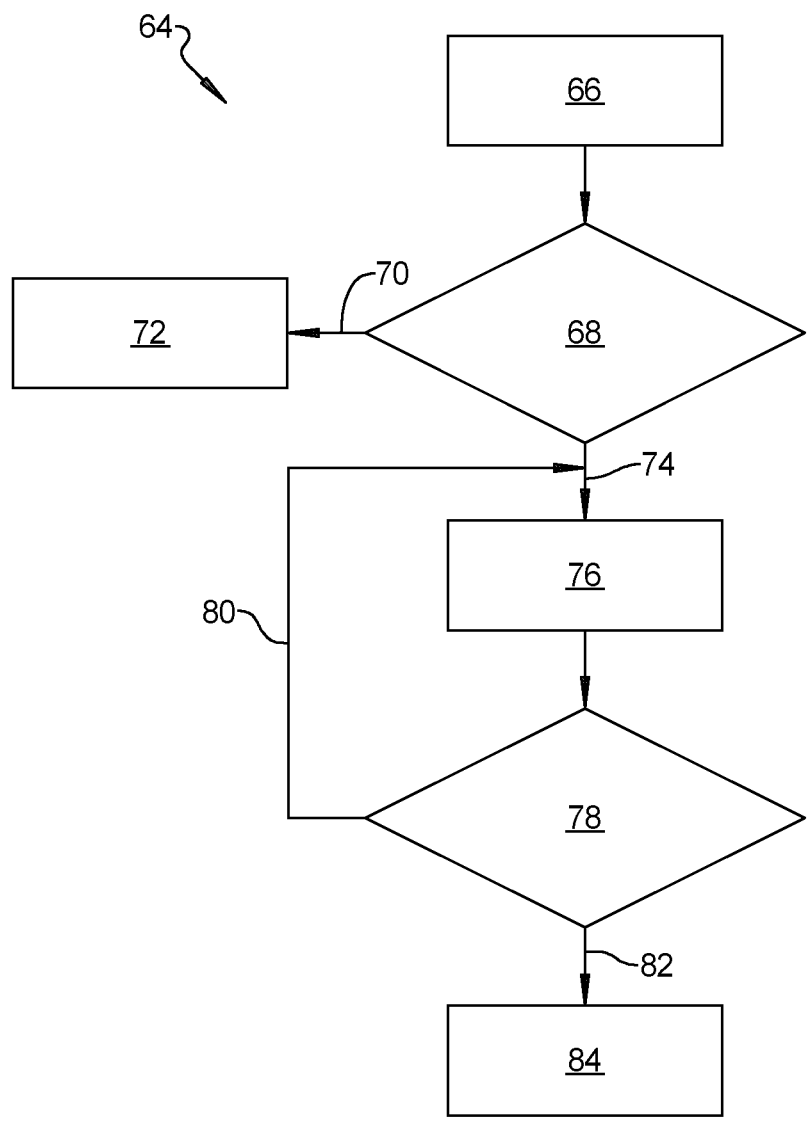
FIG. 3 is a flow diagram presenting steps for operating the system of FIG. 1.

Referring to FIG. 3 and again to FIGS. 1 and 2, a method step flowchart 64 presents steps for operation of the pre-engaged piston starter system and method for operating a pre-engaged starter system 10 of the present disclosure which includes an initiation step 66 wherein a determination is made if the engine 12 is stopping and if a fuel supply to the engine 12 is being cut. Following the initiation step 66, a query step 68 is performed to identify if conditions warrant an engine auto-stop. If an engine auto-stop is not initiated a NO signal 70 is generated which in an isolation step 72 isolates energy from the starter motor 20, thereby mitigating against actuation of the solenoid 34 and engagement of the pinion gear 26.

During the query step 68 if conditions are identified which warrant an engine auto-stop a YES signal 74 is generated and the program proceeds to a monitoring step 76. During the monitoring step 76, the engine stopping speed 52 is monitored covering a range of engine speeds which may initially be an engine operating speed. During the monitoring step 76 the engine stopping speed 52 in a comparison step 78 is compared to a predefined engagement criteria defining the pinion pre-engagement engine speed S calculated using Equation 1 above. If the engine stopping speed 52 does not meet the predefined engagement criteria a criteria NOT met signal 80 is generated which returns the program to the monitoring step 76.

If, during the monitoring step 76 the engine stopping speed 52 DOES meet the predefined engagement criteria defining the pinion pre-engagement engine speed S, a criteria MET signal 82 is generated. Upon generation of the criteria MET signal 82 a pinion engagement command 84 is generated which directs energy to the starter motor 20, thereby initiating actuation of the solenoid 34 and engagement of the pinion gear 26 to prepare for an auto-start of the engine 12.

Electrical Actuated Pinion Engagement will be performed as follows. Pre-Engage will be applied if the engine stop is temporary and if the engine 12 will restart within in a predetermined period of time. Electrical Actuated Pinion Engagement will be activated during a Drive operation or during a Hybrid operation which involves an engine fast start.

Electrical Actuated Pinion Engagement will NOT be performed under the following conditions. Electrical actuated pinion engagement will not be performed during a key crank start and following a key shut-off, and any engine shut-off occurring with the transmission in Park will also not exercise pre-engagement.

Electrical Actuated Pinion with Mechanical Latch. Since the latch can also keep the pinion gear 26 engaged without electrical current, it can be kept engaged even after key off. All conditions can pre-engage during the engine shut off, including key off.

A pre-engaged piston starter system and method for operating a pre-engaged starter system 10 of the present disclosure offers several advantages. These include a system and method to control the timing of a starter pinion engagement during an engine stop event to provide smooth and quiet engagement. The present system and method also improves an engine auto-start total response time.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A pre-engaged piston starter system of an automobile vehicle, comprising:
    a starter motor providing a rotational energy to a starter gear;
    a pinion gear releasably engaged with a flywheel, the pinion gear transferring the rotational energy from the starter gear to the flywheel;
    an auto-stop mode wherein an engine speed is decreased below a calibrated threshold speed; and
    a calculated pinion pre-engagement engine speed allowing engagement of the pinion gear after the engine speed is reduced below the calibrated threshold speed, the calculated pinion pre-engagement engine speed (S) being calculated using:

$$S = \left(\left(1 \Big/ \left(\frac{N\# \text{ Fly Teeth}}{n}\right)\right)\Big/\right) \times (1000 \text{ msec/sec}) \times (60 \text{ sec/min})$$

wherein N represents a number of teeth on the flywheel, n represents a quantity of teeth passing during an estimated engaging time defined by Δt.

2. The pre-engaged piston starter system of claim 1, further including:
    an engine having the flywheel to start the engine connected to the engine by an engine shaft; and
    a solenoid energized to shift the pinion gear to an engaged position between the flywheel and the starter gear.

3. The pre-engaged piston starter system of claim 2, further including an electric starter system energized when the engine speed decreases below the calibrated threshold speed to energize the solenoid to displace the pinion gear to the engaged position.

4. The pre-engaged piston starter system of claim 3, further including a controller in communication with the electric starter system to electrically and automatically energize the solenoid.

5. The pre-engaged piston starter system of claim 4, further including control signals defining a change-of-mind generated by the controller and sent to the solenoid, the change-of-mind defining an operator lifting pressure off a brake pedal.

6. The pre-engaged piston starter system of claim 2, further including a delay period of approximately 20 msec to 40 msec allowed following actuation of the solenoid until initiation of the starter motor to permit engagement of the pinion gear.

7. The pre-engaged piston starter system of claim 2, wherein following engine start the solenoid is de-energized and a biasing member provides withdrawal force to retract the pinion gear to a disengaged position.

8. The pre-engaged piston starter system of claim 2, including:
a solenoid shaft connecting the solenoid to the pinion gear; and
gear teeth of the flywheel providing mechanical rotation of the flywheel when engaged by pinion gear teeth of the pinion gear.

9. A pre-engaged piston starter system of an automobile vehicle, comprising:
an engine having a flywheel to start the engine connected to the engine by an engine shaft;
a starter motor providing rotational energy to a starter gear;
a pinion gear transferring rotational energy of the starter gear to the flywheel;
a solenoid energized to shift the pinion gear to an engaged position between the flywheel and the starter gear;
an auto-stop mode entered when an engine speed is decreased below a calibrated threshold speed defining approximately 250 rpm; and
a calculated pinion pre-engagement engine speed allowing engagement of the pinion gear when the engine speed is below the calibrated threshold speed, the calculated pinion pre-engagement engine speed (S) being calculated using:

$$S = \left(\left(1 \bigg/ \left(\frac{N\# \text{ Fly Teeth}}{n}\right)\right) \bigg/\right) \times (1000 \text{ msec/sec}) \times (60 \text{ sec/min})$$

wherein N represents a number of teeth on the flywheel, n represents a quantity of teeth passing during an estimated engaging time defined by Δt.

10. The system of claim 9, further including an electric starter system energized when the engine speed decreases below the calibrated threshold speed to energize the solenoid to displace the pinion gear to the engaged position.

11. The system of claim 10, further including:
a controller in communication with the electric starter system to electrically and automatically energize the solenoid; and
a change-of-mind signal generated by the controller and sent to the solenoid, the change-of-mind signal defining an operator lifting pressure off a brake pedal thereby requesting an auto-start operation.

12. The system of claim 11, further including an engine stopping speed monitored by the controller and covering a range of engine speeds and initially defining an engine operating speed, the engine stopping speed compared to a predefined engagement criteria defining the pinion pre-engagement engine speed.

13. The system of claim 9, wherein the auto-stop mode is further defined when the engine is stopping and a fuel supply to the engine is being cut.

14. The system of claim 9, wherein a time period of approximately 20 msec to 30 msec is eliminated from a total auto-start time following actuation of the solenoid during the auto-stop mode.

15. A method for operating a pre-engaged piston starter system of an automobile vehicle, comprising:
providing a starter motor providing a rotational energy to a starter gear;
providing a pinion gear releasably engaged with a flywheel, the pinion gear transferring the rotational energy from the starter gear to the flywheel;
providing an auto-stop mode wherein an engine speed is decreased below a calibrated threshold speed;
determining if an automobile vehicle engine is stopping and if a fuel supply to the engine is being cut;
querying if predetermined conditions defining an engine auto-stop event are present;
monitoring an engine stopping speed;
comparing the engine stopping speed to a predefined engagement criteria, the predefined engagement criteria including a calculated pinion pre-engagement engine speed allowing engagement of the pinion gear after the engine speed is reduced below the calibrated threshold speed, the calculated pinion pre-engagement engine speed (S) being calculated using:

$$S = \left(\left(1 \bigg/ \left(\frac{N\# \text{ Fly Teeth}}{n}\right)\right) \bigg/\right) \times (1000 \text{ msec/sec}) \times (60 \text{ sec/min})$$

wherein N represents a number of teeth on the flywheel, n represents a quantity of teeth passing during an estimated engaging time defined by Δt;
generating a criteria MET signal when the engine stopping speed meets the predefined engagement criteria; and
forwarding a pinion engagement command to direct energy to a starter motor, thereby initiating actuation of a solenoid and engagement of the pinion gear to prepare for an auto-start of the engine.

16. The method of claim 15, further including limiting actuation of the solenoid and pinion engagement to when an engine stop is temporary defined as an engine restart occurring within in a predetermined period of time.

17. The method of claim 15, further including precluding actuation of the solenoid and pinion engagement during a key crank start, following a key shut off, and during any engine shut-off with a transmission in a park position.

* * * * *